June 1, 1926.

E. D. TILLYER

MULTIFOCAL LENS

Filed Oct. 29, 1924

1,587,130

INVENTOR
Edgar D. Tillyer.
BY
Harry H. Styll
ATTORNEY

Patented June 1, 1926.

1,587,130

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

MULTIFOCAL LENS.

Application filed October 29, 1924. Serial No. 746,533.

This invention relates to improvements in multifocal lenses and has particular reference to the provision of a trifocal lens formed of a plurality of sections of material, generally known as of the fused type.

An important object of the present invention is to provide an improved multifocal lens wherein several optical additions are given to a major blank by the insertion of a plurality of segments. Another object of the invention is to provide such a lens wherein the overlapping of adjacent segments will not produce any optical addition.

Still another object is to provide such a device which will be neat in appearance, strong and durable in service, and which will have both surfaces of the finished lens continuous.

Other objects and advantages should be apparent from the following description taken in connection with the accompanying drawings wherein is shown for the purposes of illustration a preferred embodiment of the invention.

Figure 1:
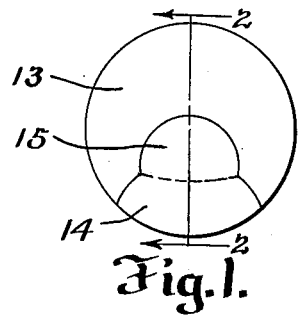
Figure 1 is an elevation of a finished lens made in accordance with the invention.
Figure 2:
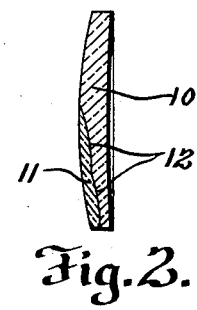
Figure 2 is a sectional view on the line 2—2 of Figure 1.
Figure 3:
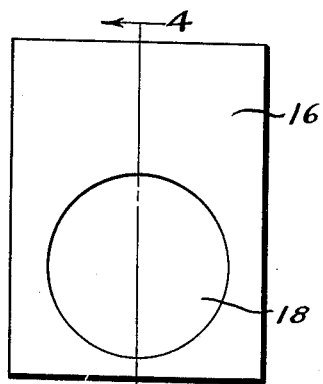
Figure 3 is an elevation of a partly finished blank used in the production of the improved lens.
Figure 4:
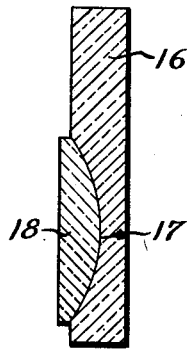
Figure 4 is a sectional view on the line 4—4 of Figure 3.

As best shown in Figures 1 and 2, the present improved lens comprises a main body portion 10 and an inserted segment 11. On one of its surfaces the body portion 10 is provided with a plurality of intersecting recesses 12—12 into which the segment 11 is secured in any desirable manner. The major portion 10 and the segment 11 are each of a different refractive index; for example, the major portion 10 may be formed of crown glass, whereas the segment is formed of flint glass. In this way a multifocal lens is produced wherein the upper portion 13 is suitable for distance vision and the lower portion 14 is suitable for reading or other similar near distance work, and the intermediate zone 15 has an optical power intermediate that of the other two fields.

Figure 5:
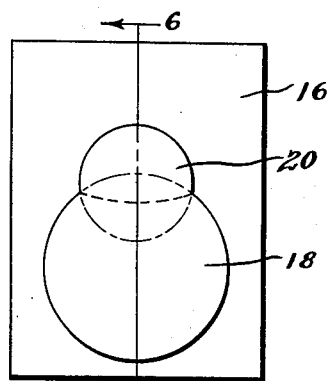
Figure 5 is a view similar to Figure 3, illustrating the assembling of the several portions prior to their being ground.
Figure 6:
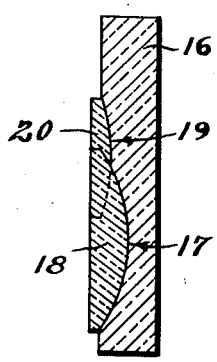
Figure 6 is a section on the line 6—6 of Figure 5.

In the production of this lens a crown glass blank 16 is provided upon one of its surfaces with a ground and polished recess 17 into which is secured either by cementing or fusing a spherically curved button 18 formed of flint glass. The second spherical recess 19 is then formed, part of which overlies the segment 18 and the remainder being entirely within the blank 16, and a second spherically curved button 20 is suitably secured within the said recess 19. The recess 19 is preferably of a smaller diameter than the recess 17, as best shown in Figure 5, and the bottom curvature 19 is of a longer radius than the curvature 17. Both the buttons 18 and 20 are of the same refractive index, so that the overlapping of them will not produce any addition other than that caused by its combination with the crown glass, consideration being given to the bottom curvature. In other words, when the segment button 20 is fused in place, because of its being the same kind of glass as the first button, it will completely fuse therewith before being secured to the blank 16 and the two buttons really become as integral as if they had originally been formed of the same piece of material.

In this way a very desirable lens is produced, which, while having two segments inserted in a main body portion, will have no possibility of the segments working loose or being objectionable in any other way. The lines of joinder between the adjacent fields are practically unnoticeable and the intermediate field 15 is of a smaller area than the reading field 14 which may be considered desirable by some people.

Figure 7:
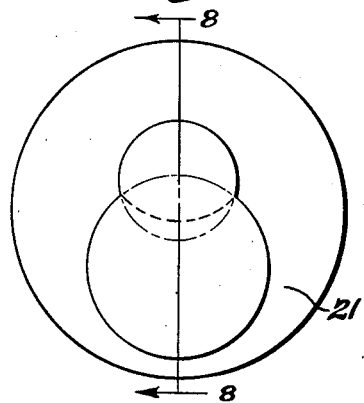
Figure 7 is an elevation of a blank of a modified form.
Figure 8:
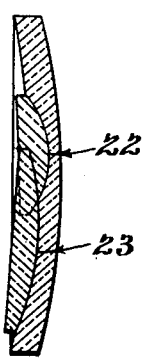
Figure 8 is a section on line 8—8 of Figure 7.

Referring particularly to Figures 7 and 8 a modification is illustrated wherein a blank 21 is provided with two recesses 22 and 23 respectively, the former being of a smaller diameter and stronger curvature than the later. A pair of flint glass buttons is inserted in these recesses in the same manner as in the previously described preferred embodiment, the difference between the two blanks being that in this form the reading portion will lie between the distance portion and the intermediate portion.

From the foregoing, it will be evident that I have produced an improved multifocal lens which will be neat in appearance, strong and durable in service and possessing good optical properties.

Obviously, changes may be resorted to in the minor details and arrangements of the parts and the right is herein reserved to make such changes falling within the scope of the appended claims without departing from the spirit of the invention.

Having thus described my invention, what I claim is:

1. A multifocal lens comprising a major portion having a plurality of intersecting and overlapping spherical recesses of different curvature in one of its surfaces, and a segment of a different kind of glass secured in each of the recesses, both segments being of the same kind of glass and a single continuous curve over the major portion and the segments.

2. A multifocal lens comprising a major portion having a plurality of intersecting and overlapping spherical recesses of different curvature in one of its surfaces, and a segment of a different kind of glass fused in each of the recesses, said segment being formed of a plurality of glass members of the same refractive index fused together.

3. A multifocal lens comprising a major portion having a plurality of intersecting and overlapping recesses of different curvature in one of its surfaces, a plurality of inserts secured in the recesses, all of said inserts being of the same kind of material and having a higher refractive index than that of the major portion, and a continuous curve over the major portion and the inserts.

4. A multifocal lens comprising a major portion of crown glass, and a plurality of intersecting and overlapping inserts of flint glass secured in one surface of the major portion, each of the inserts having a different radius of curvature on its embedded surface, and a continuous curve over the major portion and the inserts whereby a plurality of optical additions are produced.

EDGAR D. TILLYER.